United States Patent
Dai et al.

(10) Patent No.: US 11,234,803 B2
(45) Date of Patent: Feb. 1, 2022

(54) ELECTRIC CLEANING AND CARE APPLIANCE, PRESSURE ALARMING METHOD AND APPARATUS FOR THE APPLIANCE

(71) Applicant: Shanghai Shift Electrics Co., Ltd., Shanghai (CN)

(72) Inventors: Xiaoguo Dai, Shanghai (CN); Zhenwu Xu, Shanghai (CN)

(73) Assignee: Shanghai Shift Electrics Co., Ltd., Shanghai (CN)

( * ) Notice: Subject to any disclaimer, the term of this patent is extended or adjusted under 35 U.S.C. 154(b) by 442 days.

(21) Appl. No.: 16/462,191

(22) PCT Filed: Dec. 7, 2016

(86) PCT No.: PCT/CN2016/108884
§ 371 (c)(1),
(2) Date: May 17, 2019

(87) PCT Pub. No.: WO2018/098838
PCT Pub. Date: Jun. 7, 2018

(65) Prior Publication Data
US 2019/0328498 A1  Oct. 31, 2019

(30) Foreign Application Priority Data
Dec. 2, 2016  (CN) .......................... 201611096268.5

(51) Int. Cl.
*A61C 17/22* (2006.01)
*A61C 17/34* (2006.01)
*H02P 25/00* (2006.01)

(52) U.S. Cl.
CPC ........ *A61C 17/221* (2013.01); *A61C 17/3481* (2013.01); *H02P 25/00* (2013.01); *A46B 2200/1066* (2013.01)

(58) Field of Classification Search
CPC ... A61C 17/221; A61C 17/3481; H02P 25/00; A46B 2200/1066
See application file for complete search history.

(56) References Cited

U.S. PATENT DOCUMENTS

| 8,558,430 B2 | 10/2013 | Klemm et al. |
| 9,259,302 B2 | 2/2016 | Miller |

(Continued)

FOREIGN PATENT DOCUMENTS

| CN | 1300447 A | 6/2001 |
| CN | 1792023 A | 6/2006 |

(Continued)

OTHER PUBLICATIONS

European Patent Application No. 16922584.4; Office Action—Article 94(3); dated Oct. 25, 2019; 3 pages.

(Continued)

*Primary Examiner* — Weilun Lo
(74) *Attorney, Agent, or Firm* — BakerHostetler

(57) ABSTRACT

The invention relates an electrical cleaning and care appliance, pressure alarming method and apparatus for the appliance. Transducer elastic members of the appliance engage in resonance oscillation motion with bending strain characteristics, are symmetrically distributed on the left and right sides of the longitudinal axis ($L_2$) of a drive shaft, and have approximately equal section moduli in bending, approximately equal lengths, approximately equal deflection amplitudes and opposite flexure directions; the angle between the longitudinal axis ($L_1$) of a cleaning element and the normal direction of the transducer elastic member plane is 0° to 60°; the frequency of the alternating current in a drive coil is a fixed value equal to $f_{0max}-n$, where n is a fixed value in the (Continued)

range of $-0.3(f_{0max}-f_{0min})$ to $0.85(f_{0max}-f_{0min})$. Therefore, the appliance has a higher mechanical efficiency, a simple structure and a lower cost.

15 Claims, 7 Drawing Sheets

(56) References Cited

U.S. PATENT DOCUMENTS

| | | | |
|---|---|---|---|
| 2002/0084707 | A1 | 7/2002 | Tang et al. |
| 2012/0068634 | A1 | 3/2012 | Klemm et al. |
| 2015/0327668 | A1* | 11/2015 | Bloch .................. A61C 17/221 15/22.1 |
| 2016/0192769 | A1* | 7/2016 | Bloch ................ A46B 15/0081 15/22.1 |
| 2018/0185128 | A1* | 7/2018 | Dai .......................... H02K 7/06 |
| 2018/0250107 | A1* | 9/2018 | Dai ........................ H02K 33/02 |

FOREIGN PATENT DOCUMENTS

| | | |
|---|---|---|
| CN | 104617704 A | 5/2015 |
| CN | 104617732 A | 5/2015 |
| CN | 105227036 A | 1/2016 |
| CN | 106037973 A | 10/2016 |
| CN | 206548628 U | 10/2017 |
| CN | 106618776 B | 12/2018 |
| DE | 102014007361 A | 11/2015 |
| JP | 2003-210495 A | 7/2003 |
| JP | 2010-104718 A | 5/2010 |
| JP | 2013-537798 A | 10/2013 |
| JP | 2016-505330 A | 2/2016 |
| WO | WO 2000/45444 A1 | 8/2000 |
| WO | WO 2016/119136 A1 | 8/2016 |

OTHER PUBLICATIONS

European Patent Application No. 16922584.4; Search Report; dated Oct. 15, 2019; 4 pages.
International Patent Application No. PCT/CN2016/108884; Int'l Search Report; dated Aug. 29, 2017; 2 pages.
European Patent Application No. 16922584.4; Office Action—Article 94(3); dated Mar. 20, 2020; 6 pages.
Japan Patent Application No. 2019-529864; Decision of Refusal; dated Aug. 17, 2021; 6 pages.

* cited by examiner

ELECTRIC CLEANING AND CARE APPLIANCE, PRESSURE ALARMING METHOD AND APPARATUS FOR THE APPLIANCE

CROSS-REFERENCE TO RELATED APPLICATIONS

This application is a U.S. national stage application of International Patent Application No. PCT/CN2016/108884, filed on Dec. 7, 2016, which claims priority to Chinese patent application number 201611096268.5, filed on Dec. 2, 2016, the disclosure of which is incorporated herein by reference in its entirety.

TECHNICAL FIELD

The invention relates to an electric cleaning and care appliance, and also to a pressure alarming method and pressure alarming apparatus for the cleaning and care appliance.

BACKGROUND

In an electric cleaning and care appliance (hereinafter referred to as cleaning and care appliance), a resonance oscillation drive system is often used to drive the cleaning element to make rotary motion, so as to operate at a desired high efficiency. As described in another patent application PCT/CN2015/071696 of the applicant, the cleaning and care appliance comprises a handle comprising a handle housing, inside which are mounted a power supply portion for supplying power to respective portions of the appliance, a control portion for controlling various operation modes of the appliance and turning on or off the appliance, a trigger portion for turning on or off the operation of the appliance and a driver for converting input electric energy into mechanical energy output. The driver comprises a transducer, a drive coil, and a drive coil iron core provided in the drive coil. When an alternating current i flows through the drive coil, the permanent magnets provided on the transducer are subjected to a reaction force of the electromagnetic force and drive the transducer to make reciprocating rotary motion at the frequency of the alternating current, thereby driving cleaning element carrier fit on the drive shaft of the transducer as well as the cleaning element provided on the cleaning element carrier to make reciprocating rotary motion, to achieve the cleaning movement. In this structure, the transducer, the cleaning element carrier and the cleaning element have natural frequency $f_n$, and the current in the drive coil has drive frequency $f_0$. $f_n$ and $f_0$ are very close. Generally, if the condition $0.85f_0<f_n<1.05f_0$ is satisfied, the electromagnetic force between the drive coil and the transducer could keep the transducer, the cleaning element carrier and the cleaning element in a resonance oscillation state, thereby achieving a high mechanical efficiency.

The invention patent with the authorization announcement number CN101346106B discloses an adaptive drive system using current values for a personal care appliance. Over the lifetime of the appliance, when the appliance is in actual use, stator current is continuously measured and normalized; the operating frequency is then adjusted over a small range in order to produce a desired match between operating frequency and resonant vibration frequency for optimum operating frequency of the appliance. That is to say, in use, it can variably select the drive frequency value in a range of frequencies to make dynamic adjustment, thereby maintaining high efficiency during the life of the appliance. As stated in paragraphs [0031] and [0032] of the description, the diagram of FIG. 3 includes curves of amplitude versus operating frequency for a plurality of loads (shown as a group at 50), as well as average stator current versus frequency for those same loads (shown as a group at 52). In this particular case, the loads range from 0-250 grams, in increments of 25 grams. In the case of amplitude versus frequency, the unloaded condition is line 54, with the highest excursion, while the line representing the other extreme of a full load of 250 grams is line 58, with the lowest excursion. For average stator current v. frequency values, line 60 has the greatest excursion, in both directions, while line 62, with the least excursion in both directions, represents the current change with frequency for a maximum load of 250 grams. A plurality of load lines between the loaded and unloaded lines (both amplitude and current) are located between the minimum and maximum loads and represent a plurality of different loads. Straight line 66 in FIG. 3 represents a flat load curve with an amplitude of 11°, while the individual black dots represent the operating frequency to produce an 11° amplitude at the plurality of load values between 0-250 grams in 25 gram increments.

Therefore, as can be seen from the straight line 66, increase in the load causes the frequency corresponding to the maximum amplitude to shift toward smaller values of the frequency. For example, the intersection of group 54 and line 66 represents the maximum amplitude point in the unloaded state. The intersection of group 58 and line 66 represents the maximum amplitude point in the state of 250 gram full load. The operating frequency corresponding to the intersection of group 54 and line 66 is greater than the operating frequency corresponding to the intersection of group 58 and line 66.

In the invention patent application No. CN104883997A, there is disclosed a electric toothbrush with a pressure sensor, comprising: a system for determining pressure applied against a user's teeth by bristles of the toothbrush by a direct force measurement; a system for determining pressure applied against the user's teeth by the bristles of the toothbrush by a dynamic force measurement; and a processing system responsive to the pressure determined by the direct force measurement and the dynamic force measurement to adjust the pre-established amount of pressure indicative of excessive bristle force.

SUMMARY

The invention is a modification of the patent application PCT/CN2015/071696. The object of the invention is to provide a low-cost electric cleaning and care appliance having a reliable performance and complete functions. Another object of the invention is to provide a pressure alarming method for the electric cleaning and care appliance. Still another object of the invention is to provide a pressure alarming apparatus for the electric cleaning and care appliance.

The electric cleaning and care appliance provided by the invention comprises: a handle comprising a handle housing, a power supply portion for supplying power to respective portions of the appliance, a control portion for controlling various operation modes of the appliance and turning on or off the appliance, a trigger portion for turning on or off the operation of the appliance and a driver for converting input electric energy into mechanical energy output, wherein the power supply portion, the control portion, the trigger portion and the driver are mounted inside the handle housing. The driver comprises a transducer, a drive coil, and a drive coil iron core provided in the drive coil. When an alternating current flows through the drive coil, permanent magnets provided on the transducer are subjected a reaction force of the electromagnetic force and drive the transducer to make reciprocating rotary motion at the frequency of the alternating current, thereby driving the cleaning element fit on the drive shaft of the transducer to make reciprocating rotary motion. The transducer comprises at least two transducer elastic members, which engage in the resonance oscillation motion with bending strain characteristics and are distributed symmetrically on the left and right sides of the longitudinal axis of the drive shaft. The left and right side transducer elastic members are at an angle of 180°, and are approximately equal in length and in section modulus in bending (namely, bending resistant section factor) such that the deflection amplitude of the left side transducer elastic member and the deflection amplitude of the right side transducer elastic member are approximately equal, and the flexure direction of the left side transducer elastic member and the flexure direction of the right side transducer elastic member are opposite. The longitudinal axis of the cleaning element and the normal direction of the plane of the transducer elastic member are at an angle of 0° to 60°. The frequency of the alternating current in the drive coil is a fixed value equal to $f_{0max}$–n, n being some fixed value in the range of $-0.3(f_{0max}-f_{0min})$ to $0.85(f_{0max}-f_{0min})$, wherein $f_{0max}$ is the frequency of the current of the drive coil corresponding to the maximum value of the average voltage on the current-detecting resistor; $f_{0min}$ is the frequency of the current of the drive coil corresponding to the minimum value of the average voltage on the current-detecting resistor.

The difference between the section modulus in bending of the left side transducer elastic member and the section modulus in bending of the right side transducer elastic member is less than 10%, and the difference between the lengths of the left and right side transducer elastic members is less than 10%, so that difference between the deflection amplitude of the left side transducer elastic member and the deflection amplitude of the right side transducer elastic member is less than 10%.

The angle between the longitudinal axis of the cleaning element and the normal direction of the plane of the transducer elastic member may be equal to or greater than 0° and equal to or smaller than 30°, and is preferably equal to 0°.

The thickness of the left and right side transducer elastic members in the normal direction of the plane of the transducer elastic member is smaller than 1/10 of the width thereof in the direction approximately parallel to the longitudinal axis of the drive shaft.

In the case of the same magnitude of the driving force and the same point of action of the driving force, if the deflection of the transducer elastic member caused by the force whose direction is approximately parallel to the longitudinal axis of the drive shaft and whose vector direction is in the plane of the transducer elastic member is ξ1, and the deflection of the transducer elastic member caused by the force whose direction is approximately perpendicular to the longitudinal axis of the drive shaft and whose vector direction is perpendicular to the plane of the transducer elastic member is ξ2, then ξ1 is approximately 1/1000 of ξ2.

The pressure alarming method for the electric cleaning and care appliance provided by the invention comprises the steps of:

1) selecting approximately equal lengths and approximately equal section moduli in bending for the left and right side transducer elastic members in the cleaning and care appliance, such that the deflections of the left and right side transducer elastic members are approximately equal in amplitude, and the flexure directions of the left and right side transducer elastic members are opposite, and adjusting the angle between the longitudinal axis of the cleaning element and the normal direction of the plane of the transducer elastic member to the range of 0° to 60°;

2) detecting average voltages on the current-detecting resistor connected in series with the drive coil of the appliance corresponding to different frequencies in the range of resonance oscillation frequencies;

3) from the average voltages on the current-detecting resistor at different frequencies recorded in step 2), selecting and recording the frequency $f_{0max}$ of the current of the drive coil corresponding to the maximum value of the average voltage on the current-detecting resistor and the frequency $f_{0min}$ of the current of the drive coil corresponding to the minimum value of the average voltage on the current-detecting resistor;

4) setting $f_{0max}$–n and storing it in an IC program, and using the $f_{0max}$–n corresponding to a selected n value as the fixed frequency $f_0$ of the current flowing through the drive coil, wherein $-0.3(f_{0max}-f_{0min}) \leq n \leq 0.85(f_{0max}-f_{0min})$, $f_{0max}$ is the frequency of the current of the drive coil corresponding to the maximum value of the average voltage on the current-detecting resistor, and $f_{0min}$ is the frequency of the current of the drive coil corresponding to the minimum value of the average voltage on the current-detecting resistor;

5) pre-storing the average value of the power supply voltage and the average voltage on the current-detecting resistor at alarm load in a program of a programmable microchip processor IC;

6) collecting voltage value $U_{NR25}$ on the current-detecting resistor as well as current power supply voltage value $U_{Ns}$ at a current load, when the appliance is working;

7) comparing the voltage value $U_{NR25}$ on the current-detecting resistor at the current load with the average value $U_{Ls}$ of the power supply voltage at the alarm load pre-stored in the programmable microchip processor IC; not outputting alarm signal or stopping current pressure alarm signal output, if $(U_{Ns}/U_{Ls}) \times U_{NR25} > U_{LR25}$; and outputting a pressure alarm signal and sending an alarm, if $(U_{Ns}/U_{Ls}) \times U_{NR25} \leq U_{LR25}$.

Sound and/or light and/or mechanical vibration modes may be used as the pressure alarm manner.

Adjusting the angle between the longitudinal axis of the cleaning element and the normal direction of the plane of the transducer elastic member may include adjusting the angle such that the natural frequency $f_n$ of the transducer increases as the force applied by the load onto the cleaning element increases.

The pressure alarming method further includes controlling a rate at which the transducer natural frequency $f_n$ changes as the force applied by the load onto the cleaning element increases, such that the smaller the angle between the longitudinal axis of the cleaning element and the normal direction of the plane of the transducer elastic member, the greater the rate at which the transducer natural frequency $f_n$ changes as the force applied by the load onto the cleaning element increases; and the greater the angle between the longitudinal axis of the cleaning element and the normal direction of the plane of the transducer elastic member, the smaller the rate at which the transducer natural frequency $f_n$ changes as the force applied by the load onto the cleaning element increases.

The load value for resonant vibration of the transducer and the driving force may be selected by selecting the value of n. The smaller the value of n, the larger the load value for resonant vibration of the transducer and the driving force.

The pressure alarming device for implementing the method provided by the invention comprises a detection, collection and alarming circuit and an alarming component, the circuit comprising a power supply, a programmable microchip processor IC and an H-bridge circuit formed of transistors for joining the power supply and the drive coil. $f_{0max}-n$ is stored in the program of the microchip processor IC. $f_{0max}-n$ corresponding to a selected n value is used as the fixed frequency $f_0$ of the current flowing through the drive coil, wherein $-0.3(f_{0max}-f_{0min}) \leq n \leq 0.85(f_{0max}-f_{0min})$, $f_{0max}$ is the frequency of the current of the drive coil corresponding to the maximum value of the average voltage on the current-detecting resistor, and $f_{0min}$ is the frequency of the current of the drive coil corresponding to the minimum value of the average voltage on the current-detecting resistor. The average value $U_{Ls}$ of the power supply voltage and the average voltage $U_{LR25}$ on the current-detecting resistor $R_{25}$ at the alarm load are also pre-stored in the program of the microchip processor IC. The programmable microchip processor IC outputs square waves at a fixed frequency $f_0$ to drive the H-bridge circuit. If $(U_{Ns}/U_{Ls}) \times U_{NR25} > U_{LR25}$, alarm signal is not output or the current pressure alarm signal output is stopped; if $(U_{Ns}/U_{Ls}) \times U_{NR25} \leq U_{LR25}$, a pressure alarm signal is output and an alarm is sent.

The alarming component may be a buzzer device and/or a light emitting device and/or a mechanical vibration device.

The invention creatively introduces the concept of increasing the natural frequency $f_n$ of the transducer as the load increases, such that as the load increases, the natural frequency $f_n$ of the transducer generally increases, and the resonance oscillation region of the transducer shifts generally toward larger frequencies. When the direction of the pressure applied by the load onto the cleaning element 3 is perpendicular to the normal direction of the plane M of the transducer elastic member, the effect of the load on the natural frequency $f_n$ of the transducer is negligible. By reasonably adjusting the angle between the longitudinal axis of the cleaning element and the normal direction of the plane of the transducer elastic member, the natural frequency $f_n$ of the transducer is increased as the force applied by the load onto the cleaning element increases, and the rate at which the transducer natural frequency $f_n$ changes as the force applied by the load onto the cleaning element increases can be controlled. Once the fixed drive frequency is set, the drive frequency does not change during operation of the cleaning and care appliance, so that the amplitude of the cleaning element goes from small to large, and at the same time, the current value of drive coil monotonously decreases from high to low, whereby the personal electric cleaning and care appliance has higher mechanical efficiency, smaller working current, less energy consumption, maximum cleaning element amplitude and the best cleaning effect at a reasonable load, and the amplitude can be reduced after the load exceeds a reasonable value to protect the gum. Furthermore, the structure is simple and the cost is low.

Figure 1:
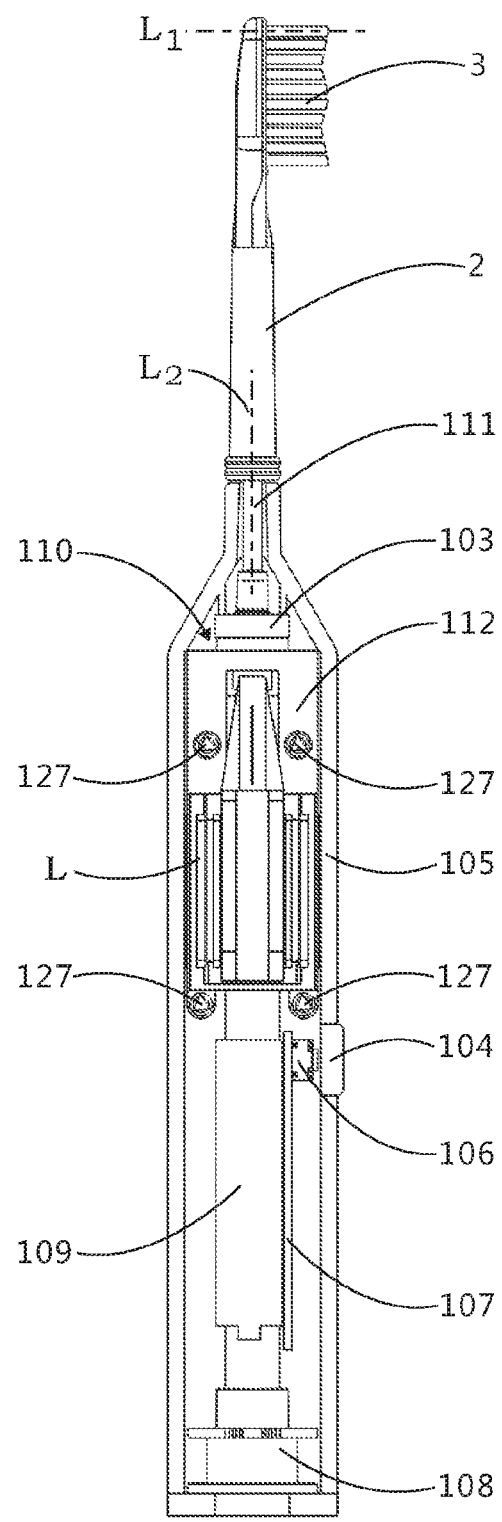
FIG. 1 is a partial cross-sectional side view of an electric cleaning and care appliance of the invention.

EXPLANATION OF MAIN REFERENCE SIGNS $Q_{21}$-$Q_{24}$ Transistors
IC Programmable microchip processor
I/O Different input/output interfaces of IC
L Inductance of the drive coil
$R_{21}$-$R_{24}$ Resistors
$R_{25}$ Current-detecting resistor
$U_{R25}$ Voltage on the current-detecting resistor
$f_0$ Drive frequency
$f_{n0}$ No-load natural frequency of the resonance oscillation system
$f_{n1}$ Natural frequency of the resonance oscillation system at Load 1
$f_{n2}$ Natural frequency of the resonance oscillation system at Load 2
$f_{n3}$ Natural frequency of the resonance oscillation system at Load 3
$I_0$ No-load average current of the drive coil
$I_1$ Current of the drive coil at Load 1, which is equivalent to the gravity load represented by a mass of 150 g in the invention
$I_2$ Current of the drive coil at Load 2, which is equivalent to the gravity load represented by a mass of 300 g in the invention
$I_3$ Current of the drive coil at Load 3, which is equivalent to the gravity load represented by a mass of 400 g in the invention
$A_0$ No-load amplitude of the cleaning element
$A_1$ Amplitude of the cleaning element at Load 1
$A_2$ Amplitude of the cleaning element at Load 2
$A_3$ Amplitude of the cleaning element at Load 3
$f_{0max}$ Frequency of the current of the drive coil corresponding to a maximum value of an average voltage on a current-detecting resistor
$f_{0min}$ Frequency of the current of the drive coil corresponding to a minimum value of the average voltage on the current-detecting resistor
$f_{1max}$ Drive frequency corresponding to a maximum value of the current of the drive coil in the resonance oscillation region at Load 1
$f_{1min}$ Drive frequency corresponding to a minimum value of the current of the drive coil in the resonance oscillation region at Load 1
$f_{2max}$ Drive frequency corresponding to a maximum value of the current of the drive coil in the resonance oscillation region at Load 2
$f_{2min}$ Drive frequency corresponding to a minimum value of the current of the drive coil in the resonance oscillation region at Load 2

$f_{3max}$ Drive frequency corresponding to a maximum value of the current of the drive coil in the resonance oscillation region at Load 3

$f_{3min}$ Drive frequency corresponding to a minimum value of the current of the drive coil in the resonance oscillation region at Load 3

$L_1$ Longitudinal axis of the cleaning element $L_2$ Longitudinal axis of the drive shaft M Plane of the transducer elastic member, which is on the transducer elastic members and also joined to the fixing member of the transducer elastic member and transducer transmission arm 2 Drive shaft
3 Cleaning element
103 Seal member
104 Switch button
105 Handle housing
106 Switch
107 Circuit board of the control circuit
108 Charging coil
109 Rechargeable battery
110 Driver
111 Drive shaft
112 Left side bracket of the driver
127 Fastening screw
214 Drive coil
215 Drive coil iron core
216 Upper left permanent magnet of the transducer
217 Lower left permanent magnet of the transducer
218 Lower right permanent magnet of the transducer
219 Upper right permanent magnet of the transducer
222 Left side transducer elastic member of the transducer
223 Right side transducer elastic member of the transducer
224 Fixing member of the transducer elastic member of the transducer
225 Left side transmission arm of the transducer
226 Right side transmission arm of the transducer
227 Bracket of the upper left permanent magnet of the transducer
228 Bracket of the lower left permanent magnet of the transducer
229 Bracket of the upper right permanent magnet of the transducer
230 Bracket of the lower right permanent magnet of the transducer

DETAILED DESCRIPTION

Exemplary embodiments of the invention will be described in more detail hereinafter with an electric toothbrush as a typical example of the electric cleaning and care appliance of the invention and in conjunction with the accompanying drawings. Although an electric toothbrush is taken as an example for explanation in the following, the invention is not limited thereto. The invention may also be applied to an electric shaver, an electric face cleanser, an electric shower, and other personal electric cleaning and care appliances.

Similar reference signs refer to similar parts throughout the drawings.

For the sake of clarity, this description uses terms for expressing relative spatial locations, such as "upper", "lower", "left", "right" and "transverse" to briefly describe the relationships between one element or feature and another element(s) or feature(s) as shown in the figures, wherein "upper" and "lower" are relative to the longitudinal axis of the cleaning element, the end close to the cleaning element being defined as "upper", and the end opposite to "upper" (i.e., the end far from the cleaning element) defined as "lower"; the terms "left" and "right" are relative to the longitudinal axis of the drive shaft, the left side of the longitudinal axis of the drive shaft in the direction perpendicular to the longitudinal axis of the drive shaft when facing corresponding figures being defined as "left", and the right side thereof defined as "right"; the term "transverse" refers to the direction perpendicular to the longitudinal axis of the drive shaft.

In addition, the word "and/or" used in the application comprises any one and all combinations of one or more of the listed associated words.

Figure 2:
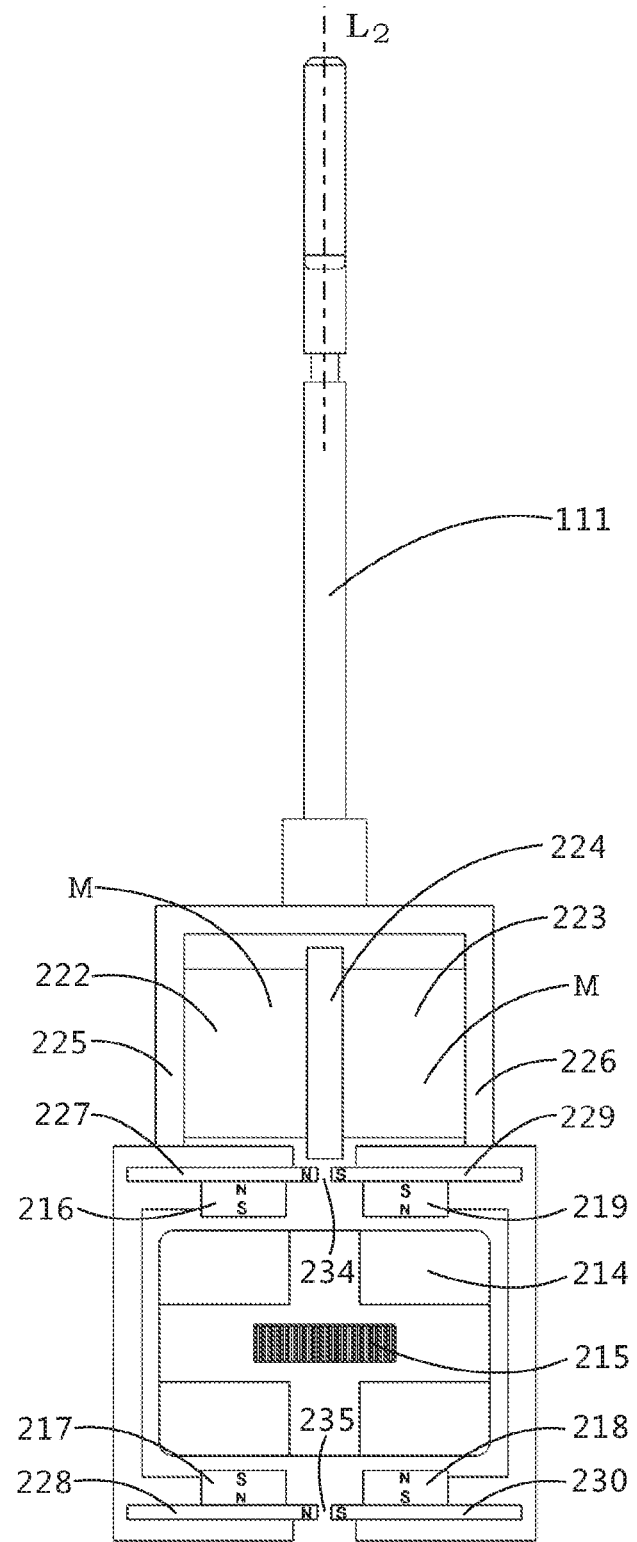
FIG. 2 is a schematic view of a driver of the cleaning and care appliance as shown in FIG. 1.

As an example of the electric cleaning and care appliance of the invention, the electric toothbrush as shown in FIGS. 1 and 2 comprises a handle having a handle housing 105, inside which are mounted a power supply portion for supplying power to respective portions of the appliance, a control portion for controlling various operation modes of the appliance and turning on or off of the appliance, a trigger portion for turning on or off the operation of the appliance and a driver 110 for converting input electrical energy into mechanical energy output. The driver 110 comprises a transducer, a drive coil 214, a drive coil iron core 215 arranged in the drive coil 214, and a left side bracket 112 of the driver and a right side bracket of the driver (not shown) for supporting the driver 110, and a cleaning assembly comprising a cleaning element carrier and a cleaning element (i.e., bristles) 3 provided on the cleaning element carrier. The cleaning assembly is detachably connected to a drive shaft 111. The transducer comprises a drive shaft 111 inserted into the cleaning assembly, at least one fixing member 224 of the transducer elastic member fastened to the left and right side brackets of the driver, at least two upper and lower permanent magnets 216, 217, 218, 219 disposed on left and right sides with respect to a longitudinal axis $L_2$ of the drive shaft respectively, respective permanent magnet brackets 227, 228, 229, 230 for fixedly connecting the permanent magnets 216, 217, 218, 219, left and right side transducer transmission arms 225, 226 fixedly connected to the permanent magnet brackets 227, 228, 229, 230 and to the drive shaft 111, and at least two left side transducer elastic member 222 and right side transducer elastic member 223 disposed on left and right sides of the longitudinal axis $L_2$ of the drive shaft respectively. One end of the left side transducer elastic member 222 and one end of the right side transducer elastic member 223 are fixedly connected to the fixing member 224 of the transducer elastic member respectively, and the other end of the left side transducer elastic member 222 and the other end of the right side transducer elastic member 223 are fixedly connected to the respective transducer transmission arms 225, 226 respectively. The left and right side permanent magnets are independent from each other. If the polarity of the magnetic pole of the left side permanent magnets in the direction toward the drive coil is S pole or N pole, the polarity of the magnetic pole of the right side permanent magnets in the direction toward the drive coil is opposite to said polarity of said magnetic pole of said left side permanent magnets. If the polarity of the magnetic pole of the right side permanent magnets in the direction toward the drive coil is S pole or N pole, the polarity of the magnetic pole of the left side permanent magnets in the direction toward the drive coil is opposite to said polarity of said magnetic pole of said right side permanent magnets. The left and right side permanent magnets 216, 217, 218, 219 are arranged such that the angle between the direction of their inner magnetic line and the direction of the longitudinal axis of the drive coil iron core is greater than 45° and less than 135°, respectively. The left and right side permanent magnets 216, 217, 218, 219 are movable relative to the fixing member 224 of the transducer elastic member. When an alternating current at frequency $f_0$ flows through the drive coil 214, the movement direction of the left and right side permanent magnets 216, 217, 218, 219 is approximately parallel with the direction of the longitudinal axis of the drive coil iron core, that is, the angle there between is greater than 170° and less than 190°, or greater than −10° and less than 10°.

In the invention, the transducer elastic members 222, 223 engage in the resonance oscillation motion mainly with bending strain characteristics. As an example, the transducer may be provided with two transducer elastic members 222, 223 distributed symmetrically at the left and right sides of the longitudinal axis $L_2$ of the drive shaft respectively, and the angle between the left and right side transducer elastic members 222, 223 is 180°. The left and right side transducer elastic members 222, 223 may be configured to have approximately equal section moduli in bending and approximately equal lengths, with a value difference of less than 10%, so that the deflection of the left side transducer elastic member 222 and the deflection of the right side transducer elastic member 223 have approximately equal amplitudes with an amplitude difference of less than 10%, and the flexure direction of the left side transducer elastic member 222 and the flexure direction of the right side transducer elastic member 223 are opposite. In addition, the thickness of the left and right side transducer elastic members 222, 223 in the normal direction of the plane M of the transducer elastic member is less than $\frac{1}{10}$ of the width of the left and right side transducer elastic members 222, 223 in the direction approximately parallel with the longitudinal axis $L_2$ of the drive shaft.

As mentioned above, the exemplary electric toothbrush of the invention comprises at least two transducer elastic members, namely left side transducer elastic member 222 and right side transducer elastic member 223. The bending strain of the elastic member material is utilized to form a transducer having a natural vibration frequency $f_n$. When the natural frequency $f_n$ of the transducer is approximately equal to the drive frequency $f_0$, the transducer gets into a state of resonance oscillation under the effect of an acting force at a drive frequency of $f_0$. In other words, when an alternating current at a frequency of $f_0$ flows through the drive coil 214 in the handle housing 105, the electromagnetic force generated by the drive coil 214 acts on the transducer and causes the transducer to be in a state of resonance oscillation.

The relationship between the magnitude of the current and the frequency of the current flowing through the drive coil 214 when there is no load on the exemplary electric toothbrush of the invention, as well as the corresponding relationship between the amplitude of the cleaning element (i.e., bristles) 3 and the frequency of the current of the drive coil, will be analyzed hereinafter. In the no-load state, there is no load (no-load) on the cleaning element 3 of the electric toothbrush. $I_0$ is the no-load average current flowing through the drive coil 214. $I_0$ is equivalent to the average current on the current-detecting resistor $R_{25}$ when there is no load. That is to say, the no-load average voltage on the current-detecting resistor $R_{25}$ may be measured by I/O25, whereby the no-load average current on the current-detecting resistor $R_{25}$ can be calculated. That is, the no-load average current flowing through the drive coil 214 may be measured by I/O25.

As shown in FIGS. 1 and 2, the longitudinal axis $L_1$ of the cleaning element (bristles) 3 is approximately perpendicular to the plane M of the left and right side transducer elastic members. "Approximately" here can be construed as that the angle error between the longitudinal axis $L_1$ of the cleaning member 3 and the plane M of the left and right side transducer elastic members is less than 15°. When the drive coil 214 of the electric toothbrush is not energized, the end surface of the cleaning element 3 is not subjected to a load, and the left and right side transducer elastic members 122, 123 are not subjected to a force in the direction approximately perpendicular to the plane M of the transducer elastic member. At this point, the angle between the left and right side transducer elastic members 222, 223 is approximately 180°. The drive frequency of the driver 110 of the electric toothbrush is fixed at $f_0$.

According to the voltage balance equation:

$$E = NBl\upsilon_M\cos(\omega t + \varphi) + I_M R_{total}\cos\omega t - L\frac{di}{dt}$$

wherein the current flowing through the drive coil 214 is expressed as $I_M \cos \omega t$, E is the electromotive force of the power supply (battery), $\omega=2\pi f_0$, $\varphi$ is the phase angle at which the speed at which the coil cuts the magnetic line lags behind the current.

Obviously:

$E=NBl\upsilon_M \cos(\omega t+\varphi)+I_M R_{total} \cos \omega t+L \sin \omega t$ The effective value of $LI_M \sin \omega t$ can be simplified as $$\frac{jI_M \omega L}{\sqrt{2}}.$$

$\varphi$ approaches zero in a resonance oscillation state according to vibration principles.

The driving force comes from the electromagnetic force generated by the energized conductor in the magnetic field (i.e., NBl$\upsilon$), and the magnetic lines generated by the inductance L are approximately parallel to the direction of motion of the transducer, so the magnetic force generated by the drive coil inductance L has almost no effect on the motion of the permanent magnets. From the above mathematical formula, it can be deduced that the current of the drive coil 214 in the resonance oscillation region will have two inflection points. The first inflection point appears when w is small, and at this point, the current is the smallest. The second inflection point appears at a slightly larger $\omega$, and at this point, the current is the largest. The resonance oscillation region depends on the natural frequency $f_n$ of the transducer and the drive frequency $f_0$ of the current in the drive coil 214. Generally, when $0.85f_0<f_n<1.05f_0$, the transducer 130 is driven by the electromagnetic force from the drive coil 214 to be in a resonance oscillation state. Therefore, when $f_n$ increases, the resonance oscillation region of the driver will shift toward the direction of larger frequencies; when $f_n$ decreases, the resonance oscillation region of the driver will shift toward the direction of smaller frequencies.

According to the principles of vibration, the vibration in the resonance oscillation region lags behind the drive force. In the invention, as described above, the left and right side transducer elastic members 222, 223 engage in the resonance oscillation motion mainly with bending strain characteristics. The left and right side transducer elastic members are symmetrically distributed on the left and right sides of the longitudinal axis $L_2$ of the drive shaft, the angle between the left and right side transducer elastic members is 180°. The left and right side transducer elastic members are configured such that the length of the left side transducer elastic member and the length of the right side transducer elastic member are approximately equal, and the section modulus in bending of the left side transducer elastic member and the section modulus in bending of the right side transducer elastic member are approximately equal. The thickness of the left and right side transducer elastic members 222, 223 in the normal direction of the plane M of the transducer elastic member is less than 1/10 of the width of the left and right side transducer elastic members 222, 223 in the direction approximately parallel with the longitudinal axis $L_2$ of the drive shaft. In this case, the armature reaction of the drive coil to the electromagnetic force of the permanent magnets comes only from the cutting action of the moving magnetic field on the energized conductor (NBlυ), and due to damping, magnetic hysteresis effect and other reasons, the frequency corresponding to a minimum current in the resonance oscillation region is slightly less than the frequency corresponding to a maximum amplitude of the transducer 130 and is also slightly less than the frequency corresponding to a maximum amplitude of the cleaning element 3. If the frequency of the current of the drive coil corresponding to a minimum value of an average voltage on a current-detecting resistor is $f_{0min}$, it is known from a large number of experiments that when there is no load, the drive frequency corresponding to a maximum amplitude of the cleaning element 3 is in the range of $f_{0min}+5$ Hz to $f_{0min}+12$ Hz, and the frequency $f_{0max}$ of the current of the drive coil corresponding to a maximum value of an average voltage on a current-detecting resistor is about 20 to 40 Hz greater than $f_{0min}$. Therefore, the frequency $f_0$ of the alternating current of the drive coil can be fixed at $f_{0max}-n$, wherein $-0.3(f_{0max}-f_{0min}) \le n \le 0.85(f_{0max}-f_{0min})$, $f_{0max}$ is the frequency of the current of the drive coil corresponding to a maximum value of the average voltage on the current-detecting resistor, and $f_{0min}$ is the frequency of the current of the drive coil corresponding to a minimum value of the average voltage on the current-detecting resistor. For example, n=10 Hz, $f_{0min}$250 Hz, $f_{0max}=f_{0min}+25$ Hz can be selected.

As described above, when the drive coil 214 of the electric toothbrush is not energized, load is not applied on the end face of the cleaning member 3. The longitudinal axis $L_1$ of the cleaning member 3 is approximately perpendicular to the plane M of the left and right side transducer elastic members, and axis $L_2$ of the drive shaft is approximately parallel to the plane M of the left and right side transducer elastic members. In this example, the thickness of the left and right side transducer elastic members 222, 223 in the normal direction of the plane M of the transducer elastic member is less than 1/10 of the width of the left and right side transducer elastic members 222, 223 in the direction approximately parallel with the axis $L_2$ of the drive shaft. The left and right side brackets of the driver are fixedly connected in the handle housing 105. The fixing member 224 of the transducer elastic member and the left and right side brackets of the driver have no relative movement. The left and right side transducer transmission arms 225, 226 are movable relative to the fixing member 224 of the transducer elastic element. The left and right transducer transmission arms 225, 226 are fixed connected to the drive shaft 111. The drive shaft 111 is detachably connected to the cleaning assembly 3. Therefore, when a load is applied on the end face of the cleaning element 3, it can be known after force analysis that the fixing member 224 of the transducer elastic member bears part or all of the pressure exerted on the cleaning member 3 by the load, and the connection region between the left and right side transducer elastic members 222, 223 and the fixing member 224 of the transducer elastic member is subjected to pressure. Since the fixing member 224 of the transducer elastic member is stationary, the pressure on the cleaning member 3 exerted by the applied load is transmitted to flex the left and right side transducer elastic members 222, 223 on the side close to the transducer transmission arms 225, 226, the flexure direction being opposite to the direction of the pressure applied by the load on the cleaning element 3. The flexure of the left and right side transducer elastic members 222, 223 caused by the load applied on the end face of the cleaning member 3 is equivalent to shortening the length of the cantilever and/or increasing the thickness of the cantilever of the elastic members during bending strain. This change in physical quantity will increase the spring stiffness coefficient K of the left and right side transducer elastic members 222, 223 in respective bending strain modes. The greater the pressure applied by the load on the cleaning element 3, the greater the spring stiffness coefficient K of the left and right side transducer elastic members 222, 223 in respective bending strain modes. According to the principles of vibration, the natural frequency $f_n$ of the transducer is proportional to $\sqrt{K}$. The greater the pressure applied by the load on the cleaning element 3, the greater the natural frequency $f_n$ of the transducer, and the larger the shift of the resonance oscillation region of the driver toward the direction of larger frequencies.

When the direction of the pressure exerted by the load on the cleaning element 3 is perpendicular to the longitudinal axis $L_1$ of the cleaning element 3 and approximately perpendicular to the longitudinal axis $L_2$ of the drive shaft, the vector of the pressure transmitted to the transducer elastic members 222, 223 falls in the plane M of the transducer elastic member. When the direction of the pressure is approximately perpendicular to the longitudinal axis $L_2$ of the drive shaft, the pressure cannot cause a change in the spring stiffness coefficient K of the left and right side transducer elastic members 222, 223 in respective bending strain modes. At this time, the pressure exerted by the load in the direction perpendicular to the longitudinal axis $L_1$ of the cleaning element 3 is equivalent to increasing the damping coefficient of the resonance oscillation system, and thus the driver resonance oscillation region is slightly shifted toward the direction of smaller frequencies. Of course, the above pressure will form a torque at the junction of the transducer elastic members 222, 223 and the fixing member 224 of the transducer elastic member, and the vector direction of the torque is the direction of the longitudinal axis $L_2$ of the drive shaft. However, said torque has a very limited, or even negligible, effect on the natural frequency $f_n$ of the transducer, because the cleaning member 3 is usually made of elastic nylon filaments, the force or moment is poorly transmitted in the bending direction of the nylon filaments, and the distance from the point of action of the pressure to the junction of the fixing member 224 of the transducer elastic member and the transducer elastic members 222, 223 is very small.

When the direction of the pressure exerted by the load on the cleaning element 3 is perpendicular to the longitudinal axis $L_1$ of the cleaning element 3 and approximately parallel to the longitudinal axis $L_2$ of the drive shaft, the vector of the pressure transmitted to the transducer elastic members 222, 223 falls in the plane M of the transducer elastic member. The direction of the pressure is approximately parallel to the longitudinal axis $L_2$ of the drive shaft. In the invention, the width of the transducer elastic members 222, 223 in the direction of the longitudinal axis $L_2$ of the drive shaft is set to be larger than about ten times the thickness of the transducer elastic members 222, 223 in the normal direction of the plane M of the transducer elastic member. In the case of the same magnitude of the drive force and the same point of action of the drive force, if the deflection of the transducer elastic members 222, 223 caused by the force whose direction is approximately parallel to the longitudinal axis $L_2$ of the drive shaft and whose vector direction is in the plane M of the transducer elastic member is $\xi 1$, and the deflection of the transducer elastic members 222, 223 caused by the force whose direction is approximately perpendicular to the longitudinal axis $L_2$ of the drive shaft and whose vector direction is perpendicular to the plane M of the transducer elastic member is $\xi 2$, then $\xi 1$ is approximately $\frac{1}{1000}$ of $\xi 2$. Therefore, when the direction of the pressure exerted by the load on the cleaning element 3 is perpendicular to the longitudinal axis $L_1$ of the cleaning element 3 and approximately parallel to the longitudinal axis $L_2$ of the drive shaft, the pressure has a very limited effect on the natural frequency $f_n$ of the transducer, and is negligible. In addition, the pressure would form a torque at the junction of the transducer elastic members 222, 223 and the fixing member 224 of the transducer elastic member, and the vector direction of the torque is in the plane M of the transducer elastic member and approximately perpendicular to the longitudinal axis $L_2$ of the drive shaft. The torque would cause the transducer elastic members 222, 223 to twist, but not affect the natural frequency $f_n$ of the transducer under bending strain.

Apparently, when the direction of the pressure exerted by the load on the cleaning element 3 is parallel to the normal direction of the plane M of the transducer elastic member, as the load increases, the value of the natural frequency $f_n$ of the transducer will increase obviously, making the shift of the resonance oscillation region of the transducer toward the direction of larger natural frequencies more obvious. On the other hand, an increase in the load can cause an increase in the equivalent damping coefficient of the resonance oscillation system of the transducer and slightly reduce the natural frequency $f_n$ of the resonance oscillation system of the transducer. The invention creatively introduces the concept of increasing the natural frequency $f_n$ of the transducer as the load increases, such that when the load increases, the natural frequency $f_n$ of the transducer generally increases, and the resonance oscillation region of the transducer shifts generally toward the direction of larger frequencies. When the direction of the pressure applied by the load onto the cleaning element 3 is perpendicular to the normal direction of the plane M of the transducer elastic member, the load has almost no effect on the natural frequency $f_n$ of the transducer. As mentioned above, since the cleaning element 3 is usually made of elastic material (e.g., nylon filaments), the transmission effect of the force of the cleaning element 3 in the longitudinal direction $L_1$ of the cleaning element 3 is far better than in the direction perpendicular to the longitudinal direction $L_1$ of the cleaning element 3. In addition, the angle between the longitudinal direction $L_1$ of the cleaning element 3 and the normal direction of the plane M of the transducer elastic member affects the extent (rate) of the increase of the natural frequency $f_n$ of the transducer with the increase in the force applied by the load onto the cleaning element 3. The cleaning element 3 may be configured in such a manner that the angle between the longitudinal direction $L_1$ of the cleaning element 3 and the normal direction of the plane M of the transducer elastic member is 0° to 60°, preferably equal to or greater than 0° and equal to or less than 30° (ie 0°≤the angle≤30°), and more preferably 0°. In the angle range of 0° to 60°, when the angle between the longitudinal direction $L_1$ of the cleaning element 3 and the normal direction of the plane M of the transducer elastic member is 0°, the greatest force is transmitted from the load force to the normal direction of the plane M of the transducer elastic member, and therefore, the load force causes the greatest increase in the spring stiffness coefficient K of the transducer elastic members 222, 223 under respective bending strain modes, and the natural frequency $f_n$ of the transducer increases to the greatest extent (at the largest rate) as the force applied by the load onto the cleaning member 3 increases. When the angle between the longitudinal direction $L_1$ of the cleaning element 3 and the normal direction of the plane M of the transducer elastic member is 60°, the smallest force is transmitted from the load force to the normal direction of the plane M of the transducer elastic member, and therefore, the load force causes the smallest increase in the spring stiffness coefficient K of the transducer elastic members 222, 223 under respective bending strain modes, and the natural frequency $f_n$ of the transducer increases to the smallest extent (at the smallest rate) as the force applied by the load onto the cleaning member 3 increases. Therefore, in the invention, by reasonably setting the angle between the longitudinal axis $L_1$ of the cleaning element 3 and the normal direction of the plane M of the transducer elastic member, the natural frequency $f_n$ of the transducer is increased as the force applied by the load onto the cleaning element 3 increases, and the rate at which the natural frequency $f_n$ of the transducer changes as the force applied by the load onto the cleaning element 3 increases can be controlled. The smaller the angle between the longitudinal axis $L_1$ of the cleaning element 3 and the normal direction of the plane M of the transducer elastic member, the greater the rate at which the natural frequency $f_n$ of the transducer changes as the force applied by the load onto the cleaning element 3 increases. The greater the angle between the longitudinal axis $L_1$ of the cleaning element 3 and the normal direction of the plane M of the transducer elastic member, the smaller the rate at which the natural frequency $f_n$ of the transducer changes as the force applied by the load onto the cleaning element 3 increases. The mechanical efficiency of the electric cleaning and care appliance can thus be improved.

In the process of cleaning teeth with the electric toothbrush, since the cleaning element 3 is mainly composed of nylon filaments, whose mechanical properties in the compression direction are much better than in the bending direction, the pressure exerted by the teeth on the cleaning element (nylon filaments) 3 is transmitted mainly along the longitudinal axis of the cleaning element. In the process of cleaning teeth, the resistance of the teeth to the cleaning element is mainly distributed in a plane perpendicular to the direction of the longitudinal axis $L_1$ of the cleaning element 3. As described above, in the invention, by appropriately selecting the bending strain of the elastic members, the angle between the longitudinal axis $L_1$ of the cleaning member 3 and the normal direction of the plane M of the transducer elastic member, etc., it is made possible that an increase in the pressure applied by the load on the cleaning element 3 causes an increase in the natural frequency $f_n$ of the transducer. Further, since the cleaning element 3 is usually made of an elastic material (e.g., nylon filaments), the transmission effect of the force in the longitudinal direction $L_1$ of the cleaning element 3 is far better than in the direction perpendicular to the longitudinal direction $L_1$ of the cleaning element 3. Therefore, the effect of the resistance between the cleaning element 3 and the object being cleaned on the natural frequency $f_n$ of the transducer is negligible, and the magnitude of the pressure applied in the longitudinal direction $L_1$ of the cleaning element can be monitored.

Figure 3:
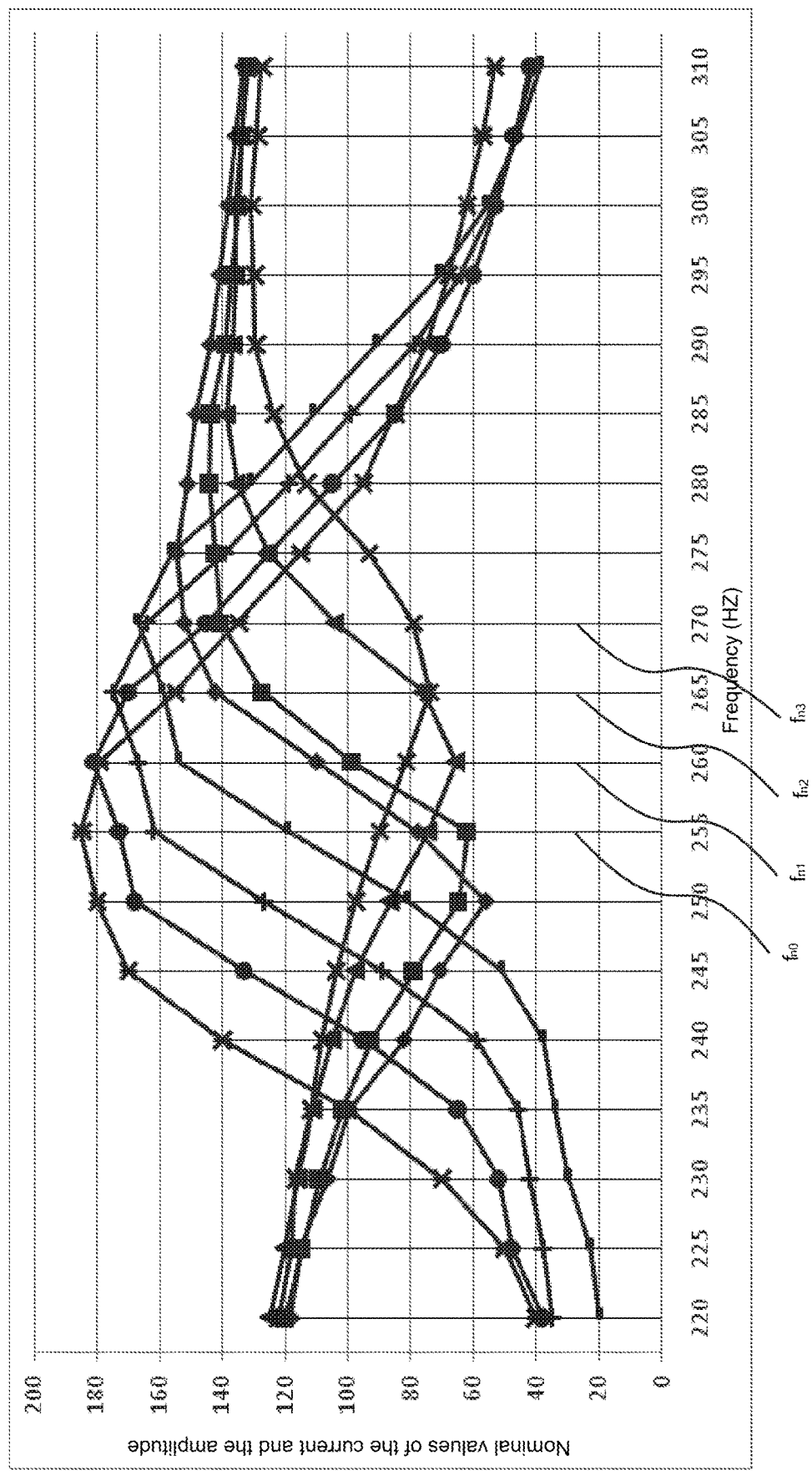
FIG. 3 shows curves of relationship between current and drive frequency and curves of relationship between amplitude and drive frequency of the appliance of the present invention at different loads, obtained through experiments.

FIG. 3 is graphs showing the relationship between the current I and the drive frequency f and between the amplitude A and the drive frequency f at different loads in the cleaning and care appliance of the invention, obtained by experiments, wherein the abscissa indicates the drive frequency and the ordinate indicates the nominal value of the current and the amplitude. As shown in FIG. 3, the longitudinal axis $L_1$ of the cleaning element is parallel to the normal direction of the plane M of the transducer elastic member. When a load of 150 gram is applied to the end face of the cleaning element 3, the frequency $f_{n1}$ (see the curve shown by the icon point "■") at an maximum amplitude of the cleaning element 3 is greater than the frequency $f_{n0}$ (see the curve shown by the icon point "♦") at a maximum amplitude of the cleaning element 3 when no load is applied. When a load of 300 gram is applied to the end face of the cleaning member 3, the frequency $f_{n2}$ (see the curve shown by the icon point "▲") at a maximum amplitude of the cleaning element 3 is greater than the frequency $f_{n1}$ at the maximum amplitude of the cleaning element 3 when the load of 150 gram is applied to the end face of the cleaning element 3. That is, the larger the applied load, the larger the natural frequency of the transducer, and increase in the applied load may cause the resonance oscillation region to shift toward the direction of larger frequencies. As in the example described above, $f_{0min}$=250 Hz, $f_{0max}$=$f_{0min}$+25 Hz, and the frequency $f_0$ of the alternating current in the drive coil is fixed at 265 Hz. Experiments found that when no load is applied, the cleaning element 3 has a maximum amplitude $A_0$ at $f_{0min}$+5 Hz=255 Hz (see the curve shown by the icon point "*"). When a load of 150 gram force is applied to the end face of the cleaning element 3, $f_{1min}$=255 Hz, $f_{1max}$=280 Hz, the cleaning element 3 has a maximum amplitude $A_1$ (see the curve shown by the icon point "●") at $f_{1min}$+5 Hz=260 Hz. When a load of 300 gram force is applied to the end face of the cleaning element 3, $f_{2min}$=260 Hz, $f_{2max}$=285 Hz, the cleaning element 3 has a maximum amplitude $A_2$ (see the curve shown by the icon point "+") at $f_{2min}$+5 Hz=265 Hz. Also shown is the data at a load of 400 gram force [at a load of 400 gram force, the maximum amplitude of the cleaning element is $A_3$ (see the curve with no icon point)]. From the above experiment data, it is known that when the longitudinal axis $L_1$ of the cleaning element is parallel to the normal direction of the plane M of the transducer elastic member, as the load applied onto the end face of the cleaning element 3 increases, the natural frequency $f_n$ of the transducer elastic members 222, 223 increases. The greater the increase in the load, the greater the increase in the natural frequency $f_n$ of the transducer elastic members 222, 223. In other words, increase in the load on the end face of the cleaning element 3 may shift the resonance oscillation region of the transducer elastic members 222, 223 toward the direction of larger frequencies. As shown in the experiment curves in FIG. 3, the frequency of the current of the drive coil is set at a fixed value $f_{0max}$-n=265 Hz, (n=10). The natural frequencies $f_n$ of the transducer in the resonance oscillation state at the maximum amplitude of the cleaning element 3 at different loads are respectively: $f_{n0}$=255 Hz; $f_{n1}$=260 Hz; $f_{n2}$=265 Hz; $f_{n3}$=270 Hz. Apparently, as the load is gradually increased from 0 gram force (no load) to 300 gram force or greater, the resonance oscillation system goes from weak resonance oscillation to resonant vibration gradually, and the mechanical efficiency of the resonance oscillation system is enhanced rapidly. Since the mechanical efficiency is enhanced faster than the damping effect generated when the load is increased, the amplitude of the cleaning element 3 is also increased rapidly ($A_2$>$A_1$>$A_0$). Further, since the minimum value of the current of the drive coil of the resonance oscillation system appears at $f_{min}$, increase in the load moves $f_{min}$ toward the direction of higher frequencies and makes $f_{min}$ closer to the drive frequency. Therefore, as the resonance oscillation system goes from weak resonance oscillation to resonant vibration, the average value of the current of the drive coil decreases. It is also known from FIG. 3 that when the load applied to the end face of the cleaning element 3 reaches 400 gram force, $f_{n3}$ (270 Hz) is larger than the fixed frequency $f_{n2}$ (265 Hz) of the alternating current of the drive coil when the load is 300 gram, and the resonance oscillation system goes from resonant vibration to weak resonance oscillation. As the load continues to increase, the resonance oscillation system tends to weaker resonance oscillation until no vibration occurs. Therefore, during the process of gradually increasing the load, the current of the drive coil appears an inflection point at a certain frequency, and will change from small to large again. Experiments have shown that the inflection point of the current appears when a load of about 450 gram force (not shown) is applied, and in the process of increasing the load, the load value (about 450 grams force) corresponding to the inflection point of current of the drive coil from small to large is larger than the load value (about 300 grams force) corresponding to the inflection point of cleaning element amplitude A from large to small, the difference between the two load values is about 150 gram force.

Figure 4:
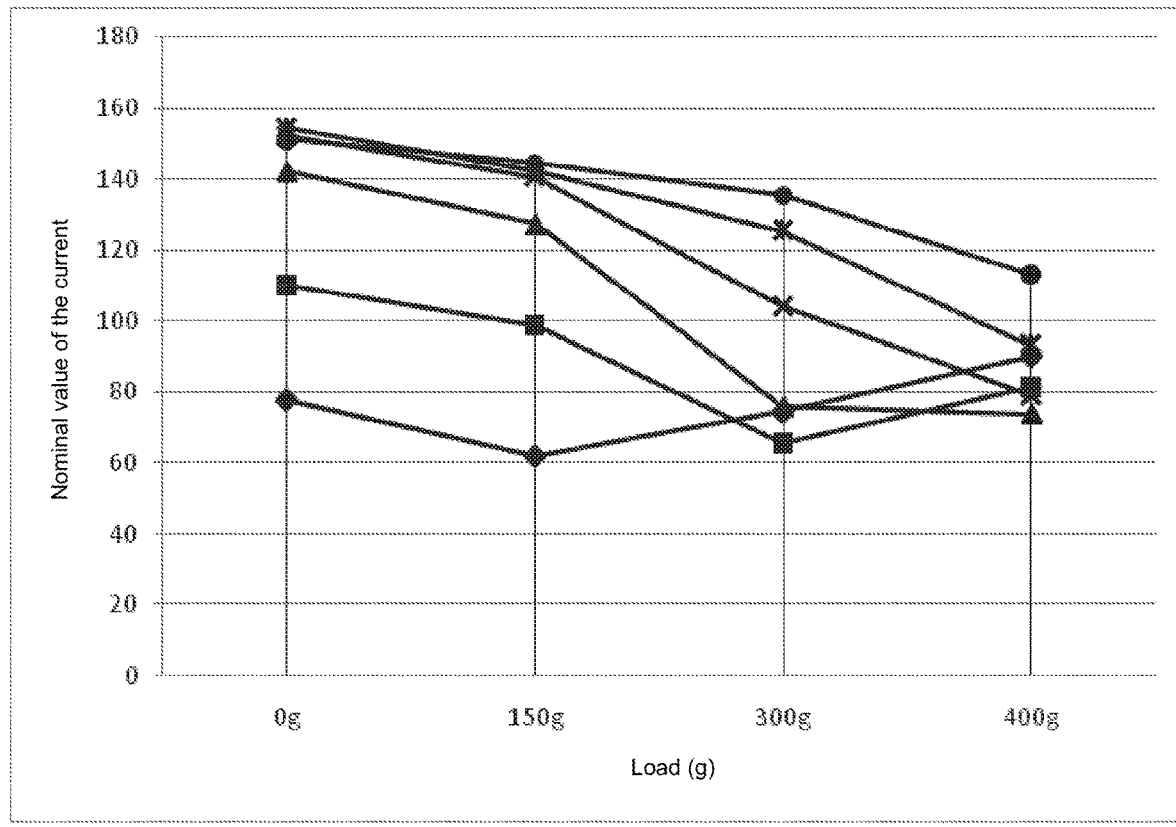
FIG. 4 shows curves of relationship between current and load of the appliance of the present invention at different drive frequencies, obtained through experiments.
Figure 5:
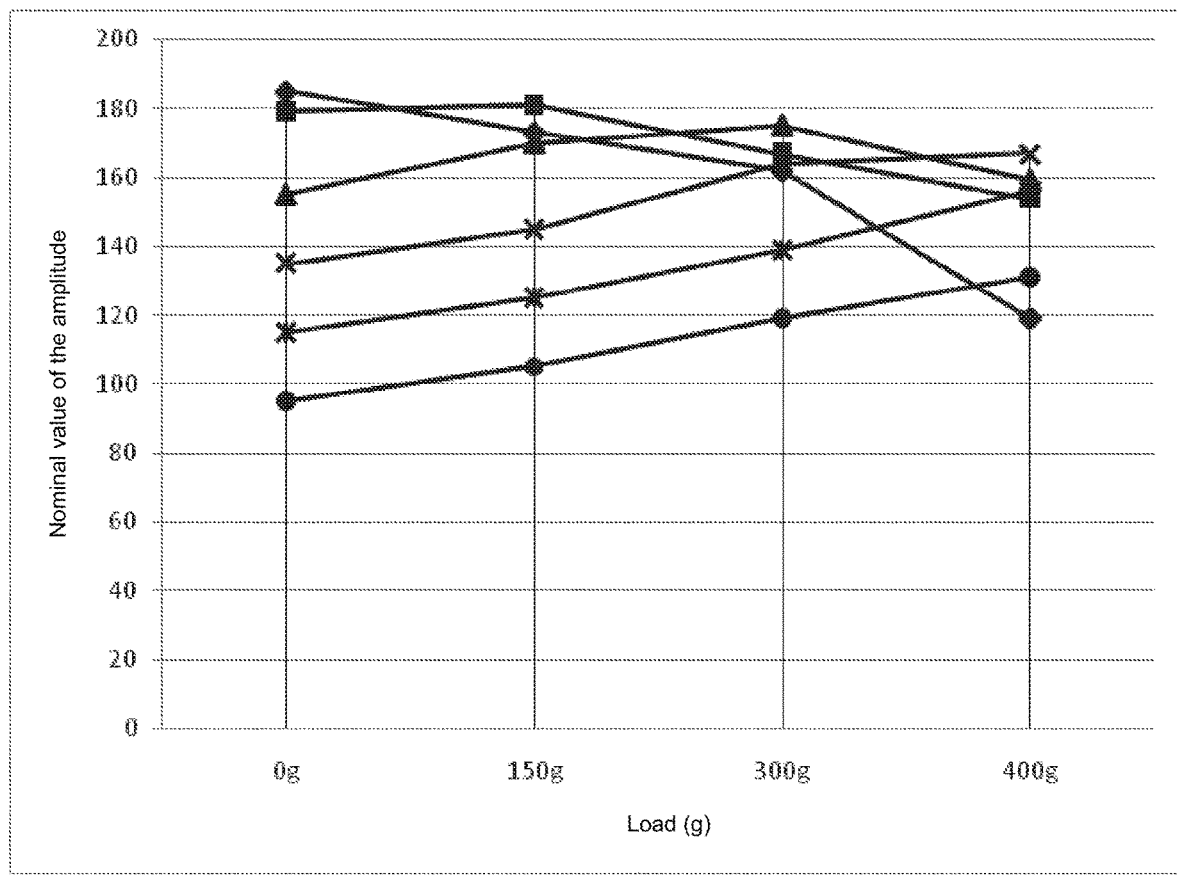
FIG. 5 shows curves of relationship between amplitude and load of the appliance of the present invention at different drive frequencies, obtained through experiments.

FIGS. 4 and 5 are graphs showing the relationship between the current and the load and between the amplitude and the load of the cleaning and care appliance of the invention at different drive frequencies, obtained by experiments. As shown in FIG. 4 [the abscissa indicates the load (gram force), and the ordinate indicates the nominal value of the current] and FIG. 5 [the abscissa indicates the load (gram force), and the ordinate indicates the nominal value of the amplitude], by changing the set value of the frequency $f_{0max}$-n of the current of the drive coil, it is possible to select to enable the resonance oscillation system to achieve resonant vibration under different load forces. In other words, by adjusting the value of n in the set value of the frequency of the current of the drive coil, it is made possible to select different load forces to make the natural frequency $f_n$ of the transducer equal to the drive frequency $f_0$ to achieve resonant vibration, and to change the value of the load corresponding to the inflection point of the current value of the drive coil. As shown in FIGS. 4 and 5, if n=−5 Hz is selected, the frequency of the resonance oscillation system at resonant vibration point corresponds to a load of 400 gram force on the cleaning element 3 (see the curves shown by icon point "●" in FIGS. 4 and 5). Meanwhile, the inflection point at which the current of the drive coil changes from small to large will appear when a load of more than about 550 gram force is applied on the cleaning element 3 (not shown). If n>10 is selected, for example n=15, the frequency of the resonance oscillation system at resonant vibration point corresponds to a load less than 300 gram force on the cleaning element 3 (see the curves shown by the icon point "●" in FIGS. 4 and 5). Meanwhile, the inflection point at which the current of the drive coil changes from small to large will appear when a load of less than 550 gram force is applied on the cleaning element 3. The frequency of the resonance oscillation system at resonant vibration point (maximum amplitude point) corresponds to a load of 150 gram force on the cleaning element 3, and the inflection point at which the current of the drive coil changes from small to large will appear when a load of 300 grams is applied on the cleaning element 3. The curves shown by the icon points "♦", "▲", "x" and "*" in FIGS. 4 and 5 indicate the relationship between the current and the load and the relationship between the amplitude and the load when n=20, n=10, n=5, n=0 are selected, respectively.

A large number of experiments have found that n can range from $-0.3 (f_{0max}-f_{0min})$ to $0.85 (f_{0max}-f_{0min})$, preferably $-0.1 (f_{0max}-f_{0min}) \leq n \leq 0.4 (f_{0max}-f_{0min})$, and more preferably $0 \leq n \leq 0.4 (f_{0max}-f_{0min})$.

In summary, by reasonably configuring the angle θ between the longitudinal axis $L_1$ of the cleaning element and the normal direction of the plane M of the transducer elastic member, the natural frequency $f_n$ of the transducer elastic members can be increased as the load pressure applied to the cleaning member 3 increases. The greater the load pressure, the greater $f_n$. This purpose can be achieved by selecting 0° ≤ θ ≤ 60°. Preferably, 0° ≤ θ ≤ 30°, more preferably θ=0°. Further, by reasonably selecting the frequency $f_{0max-n}$ of the alternating current in the drive coil, it is made possible that the resonance oscillation system of the transducer can change from weak resonance oscillation to resonant vibration when the load on the cleaning element 3 goes from no load to a reasonable load (e.g., 300 gram force). It is also possible to select $-0.3 (f_{0max}-f_{0min}) \leq n \leq 0.85 (f_{0max}-f_{0min})$, preferably $-0.1 (f_{0max}-f_{0min}) \leq n \leq 0.4 (f_{0max}-f_{0min})$, and more preferably $0 \leq n \leq 0.4 (f_{0max}-f_{0min})$. Once this fixed drive frequency is set, the drive frequency does not change during operation of the appliance, so that the amplitude of the cleaning element 3 goes from small to large, and at the same time, the current value of the drive coil monotonously decreases from high to low, whereby the personal electric cleaning and care appliance has higher mechanical efficiency, smaller working current, less energy consumption, maximum cleaning element amplitude and the best cleaning effect at a reasonable load.

Experiments have shown that when the load applied to the cleaning element 3 continues to increase and exceeds a reasonable value, the resonance oscillation system of the transducer will goes from resonant vibration to weak resonance oscillation until no vibration occurs, and the amplitude of the cleaning element 3 varies again from large to small. Meanwhile, the current of the drive coil continues to decrease monotonically until an inflection point of the current from small to large occurs, and then the current of the drive coil increases again. By selecting the value of n in $f_{0max}-n$, it is made possible that when the load on the cleaning element 3 goes from no load to a reasonable load (e.g., 300 gram force), the resonance oscillation system of the transducer goes from weak resonance oscillation to resonant vibration, the amplitude of the cleaning element 3 goes from small to large, and the current value of the drive coil monotonously decreases from high to low. That is to say, the selection of the above-mentioned reasonable load value can be realized by selecting the value of n in $f_{0max}-n$, and the smaller the value of n, the larger the corresponding reasonable load value. This process can also provide reliable protection for the gums. When the load pressure applied to the cleaning element 3 is greater than a reasonable value (e.g., 300 gram force), the amplitude of the cleaning element 3 will decrease, and the larger the load, the smaller the amplitude, whereby the gums can be effectively protected from injury.

Therefore, the above structure can not only obtain high efficiency and large amplitude at a reasonable load, but also reduce the amplitude after the load exceeds a reasonable value to protect the gums. Furthermore, it is simple structure and low-cost.

Figure 6:
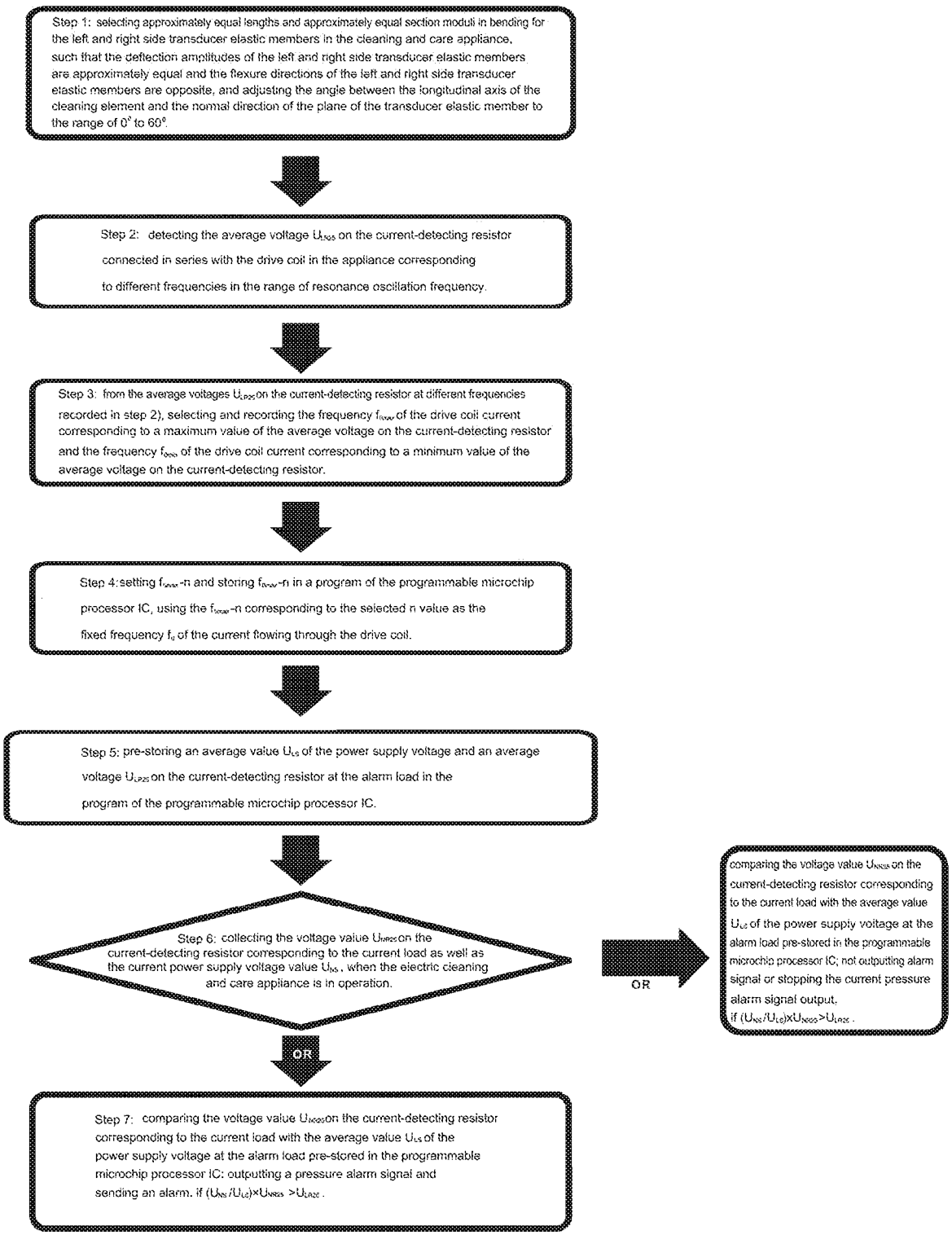
FIG. 6 is a flow chart of a pressure alarming method for the appliance of the invention.

The invention also provides a pressure alarming method for the cleaning and care appliance as described above. FIG. 6 shows the steps of the method. As shown in FIG. 6, the pressure alarming method for the cleaning and care appliance as described above includes the following steps:

1) selecting approximately equal section moduli in bending and approximately equal lengths for the left and right side transducer elastic members 222, 223 in the cleaning and care appliance, such that the deflection amplitude of the left side transducer elastic member 222 and deflection amplitude of the right side transducer elastic member 223 are approximately equal, and the flexure direction of the left side transducer elastic member 222 and the flexure direction of the right side transducer elastic member 223 are opposite, and adjusting the angle between the longitudinal axis $L_1$ of the cleaning element 3 and the normal direction of the plane M of the transducer elastic member to the range of 0° to 60°;

2) detecting the average voltage $U_{LR25}$ on the current-detecting resistor $R_{25}$ connected in series with the drive coil 214 corresponding to different frequencies in the resonance oscillation frequency range of the appliance, for example, in the resonance oscillation frequency range, stepping incrementally the frequency of the current of the drive coil by the same frequency difference Δf (e.g., 1 Hz) and at the same time interval Δt (e.g., 1 second); and measuring and recording the average voltage $U_{LR25}$ on the current-detecting resistor $R_{25}$ at different frequencies. In this example, the resonance oscillation frequency range of the transducer is about 243 Hz-300 Hz, and the frequency of the current of the drive coil in the first second is 243 Hz. The average voltage $U_{LR251}$ on the current-detecting resistor $R_{25}$ at the frequency of 243 Hz is measured and recorded. After the time interval Δt (1 second), the frequency of the current of the drive coil in the second second is 244 Hz (Δf=1 Hz). The average voltage $U_{LR252}$ on the current-detecting resistor $R_{25}$ at the frequency of 244 Hz is measured and recorded. This is continued until detection for all the frequencies within the resonance oscillation frequency range is completed. For example, the frequency of the current of the drive coil in the $58^{th}$ second is 300 Hz. The average voltage $U_{LR2558}$ on the current-detecting resistor $R_{25}$ at the frequency of 300 Hz is measured and recorded;

3) from the average voltages $U_{LR25}$ on the current-detecting resistor $R_{25}$ at different frequencies recorded in step 2), selecting and recording the frequency $f_{0max}$ of the current of the drive coil corresponding to a maximum value of the average voltage on the current-detecting resistor $R_{25}$ and the frequency $f_{0min}$ of the current of the drive coil corresponding to a minimum value of the average voltage on the current-detecting resistor $R_{25}$;

4) setting $f_{0max}-n$ and storing $f_{0max}-n$ in a program of the programmable microchip processor IC, using the $f_{0max}-n$ corresponding to the selected n value as the fixed frequency $f_0$ of the current flowing through the drive coil 214, wherein $-0.3(f_{0max}-f_{0min}) \leq n \leq 0.85(f_{0max}-f_{0min})$, $f_{0max}$ being the frequency of the current of the drive coil corresponding to the maximum value of the average voltage on the current-detecting resistor $R_{25}$, $f_{0min}$ being the frequency of the current of the drive coil corresponding to the minimum value of the average voltage on the current-detecting resistor $R_{25}$;

5) pre-storing an average value $U_{Ls}$ of the power supply voltage and an average voltage $U_{LR25}$ on the current-detecting resistor $R_{25}$ at alarm load in the program of the programmable microchip processor IC. For example, an alarm load (e.g., 300 gram force) is preset on the end face of the cleaning element 3. The alarm load is applied. IC guides a current at the fixed frequency $f_0$ which is $f_{0max}$–n (where n is a selected fixed value) through the drive coil. I/O25 detects the voltage on the current-detecting resistor $R_{25}$ many times in a short time (e.g., 3 seconds), and calculates the average voltage $U_{LR25}$ on the current-detecting resistor $R_{25}$ at the alarm load. Meanwhile, IC detects the power supply voltage many times in a short time (e.g., 3 seconds), and calculates the corresponding average value $U_{Ls}$ of the power supply voltage. The average value $U_{Ls}$ of the power supply voltage and the average voltage $U_{LR25}$ on the current-detecting resistor $R_{25}$ at the alarm load are stored in the program of the IC;

6) continuously detecting the current voltage value $U_{NR25}$ on the current current-detecting resistor $R_{25}$ and the current power supply voltage value $U_{Ns}$ by the I/O25, and collecting the current voltage value $U_{NR25}$ on the current-detecting resistor $R_{25}$ corresponding to the current load as well as the current power supply voltage value $U_{Ns}$, when the electric cleaning and care appliance is in operation;

7) comparing the voltage value $U_{NR25}$ on the current-detecting resistor $R_{25}$ corresponding to the current load with the average value $U_{Ls}$ of the power supply voltage at the alarm load pre-stored in the programmable microchip processor IC; not outputting alarm signal or stopping the current pressure alarm signal output, if $(U_{Ns}/U_{Ls}) \times U_{NR25} > U_{LR25}$; and outputting a pressure alarm signal and sending an alarm, if $(U_{Ns}/U_{Ls}) \times U_{NR25} \leqslant U_{LR25}$. For example, the programmable microchip processor IC can be used to compare the current value of the drive coil at the current load with the current value of the drive coil at the alarm load pre-stored in the IC, and compare $(U_{Ns}/U_{Ls}) \times U_{NR25}$ with $U_{LR25}$, wherein $U_{Ls}$ is the power supply voltage value detected in step 5), and $U_{Ns}$ is the power supply voltage value detected currently. If $(U_{Ns}/U_{Ls}) \times U_{NR25} > U_{LR25}$, it means that the load applied to the cleaning element 3 is less than the alarm load, and pressure alarm is not sent, i.e., alarm signal is not output or the current pressure alarm signal output is stopped; if $(U_{Ns}/U_{Ls}) \times U_{NR25} \leqslant U_{LR25}$, it means that the load applied to the cleaning element 3 is greater than the alarm load, and a pressure alarm signal is output and a pressure alarm is sent.

Sound and/or light and/or mechanical vibration modes may be used as the pressure alarm manner. After that, the IC continues to detect $U_{NR25}$ and $U_{Ns}$. When $(U_{Ns}/U_{Ls}) \times U_{NR25} > U_{LR25}$, the pressure alarm signal output is canceled; the pressure alarm is maintained otherwise. This cycle is performed repeatedly.

Figure 7:
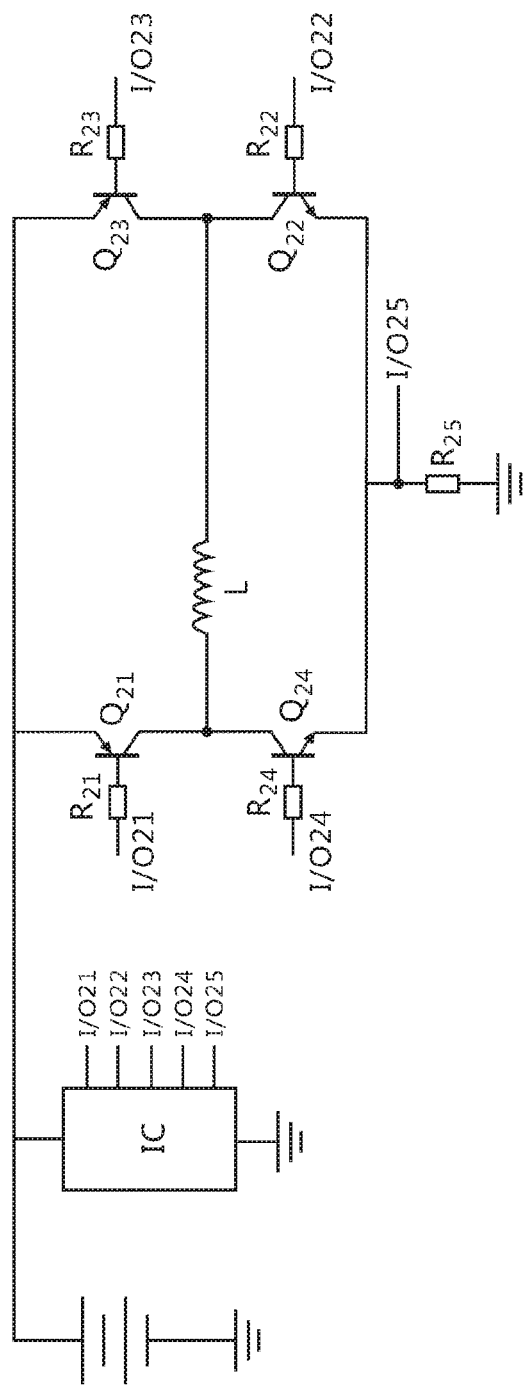
FIG. 7 is a diagram explaining the principles of a circuit portion of a pressure alarming apparatus of the invention.

The pressure alarming device for implementing the method provided by the invention comprises a detection, collection and alarming circuit and an alarming component (not shown in the figures). The detection, collection and alarming circuit comprises a power supply, a programmable microchip processor IC and an H-bridge circuit composed of transistors for coupling the power supply and the drive coil 214. $f_{0max}$–n is stored in the program of the microchip processor IC. $f_{0max}$–n corresponding to a selected n value is used as the fixed frequency $f_0$ of the current flowing through the drive coil 214, wherein $-0.3 \ (f_{0max}-f_{0min}) \leqslant n \leqslant 0.85 \ (f_{0max}-f_{0min})$, $f_{0max}$ is the frequency of the current of the drive coil corresponding to a maximum value of the average voltage on the current-detecting resistor $R_{25}$, $f_{0min}$ is the frequency of the current of the drive coil corresponding to a minimum value of the average voltage on the current-detecting resistor $R_{25}$. In addition, the average value $U_{Ls}$ of the power supply voltage and the average voltage $U_{LR25}$ on the current-detecting resistor $R_{25}$ at the alarm load are pre-stored in the program of the microchip processor IC. The programmable microchip processor IC outputs square waves at a fixed frequency $f_0$ to drive the H-bridge circuit and pre-stores the average value $U_{Ls}$ of the power supply voltage and the average voltage $U_{LR25}$ on the current-detecting resistor $R_{25}$ at the alarm load. FIG. 7 is a diagram explaining the principles of the circuit portion of the pressure alarming device of the invention. As shown in FIG. 7, in this example, four transistors $Q_{21}$-$Q_{24}$ are used to form a H-bridge circuit for coupling the power supply and the drive coil 214. The programmable microchip processor IC outputs square waves at a fixed frequency $f_0$ to drive the H-bridge circuit, so that an alternating current at a fixed frequency $f_0$ flows through the drive coil 214. The alternating current flows back to the power supply via the current-detecting resistor $R_{25}$. In the above circuit, the resistance of the current-detecting resistor $R_{25}$ is fixed, and the magnitude of the voltage $U_{R25}$ on the current-detecting resistor $R_{25}$ reflects the magnitude of the current flowing through the current-detecting resistor $R_{25}$. The current-detecting resistor $R_{25}$ is connected in series with the H-bridge circuit and the power supply, that is, one end of the current-detecting resistor $R_{25}$ is coupled to the negative pole of the power supply, and the other end of the current-detecting resistor $R_{25}$ is coupled to the current output end of the H-bridge circuit and coupled to the A/D conversion port I/O25 of the microchip processor IC for detecting the magnitude of the voltage on the I/O25 conversion port. If $(U_{Ns}/U_{Ls}) \times U_{NR25} > U_{LR25}$, alarm signal is not output or the present pressure alarm signal output is stopped; if $(U_{Ns}/U_{Ls}) \times U_{NR25} \leqslant U_{LR25}$, a pressure alarm signal is output and an alarm is sent. Obviously, with the above circuit arrangement, the microchip processor IC can detect the magnitude of the current flowing through the drive coil 214 in real time. In order to reduce the influence of the current-detecting resistor $R_{25}$ connected in series to the drive coil H-bridge circuit on the electric power of the drive coil, the current-detecting resistor $R_{25}$ usually has a small resistance value. The current-detecting resistor of the invention may have a resistance value of about $0.1\Omega$. The alarming component may be a buzzer device and/or a light emitting device and/or a mechanical vibration component.

With the above method and apparatus, a simple, reliable pressure alarm can be provided when the load exceeds a reasonable range.

What is claimed is:

1. An electric cleaning and care appliance comprising: a handle comprising a handle housing (105), inside which are mounted a power supply portion for supplying power to respective portions of the electric cleaning and care appliance, a control portion for controlling various operation modes of the electric cleaning and care appliance and turning on or off the electric cleaning and care appliance, a trigger portion for turning on or off operation of the electric cleaning and care appliance and a driver (110) for converting input electric energy into mechanical energy output, the driver (110) comprising a transducer, a drive coil (214), and a drive coil iron core (215) provided in the drive coil (214), wherein when an alternating current flows through the drive coil (214), permanent magnets (216, 217, 218, 219) provided on the transducer are subjected to a reaction force of an electromagnetic force and drive the transducer to make reciprocating rotary motion at a frequency of the alternating current, thereby driving a cleaning element (3) fit on a drive shaft (111) of the transducer to make reciprocating rotary motion, wherein the transducer comprises at least two transducer elastic members (222, 223), the at least two transducer elastic members (222, 223) engage in resonance oscillation motion with bending strain characteristics and are distributed symmetrically on left and right sides of a longitudinal axis ($L_2$) of the drive shaft, an angle between the left and right side transducer elastic members (222, 223) is 180°, and the left and right side transducer elastic members (222, 223) are approximately equal in length and in section modulus in bending, such that deflection amplitude of the left side transducer elastic member (222) and deflection amplitude of the right side transducer elastic member (223) are approximately equal, and flexure direction of the left side transducer elastic member (222) and flexure direction of the right side transducer elastic member (223) are opposite; wherein an angle between an longitudinal axis ($L_1$) of the cleaning element (3) and a normal direction of a plane (M) of the transducer elastic member is 0° to 60°; a frequency of the alternating current in the drive coil (214) is a fixed value equal to $f_{0max}-n$, n being a fixed value in the range of $-0.3(f_{0max}-f_{0min})$ to $0.85(f_{0max}-f_{0min})$, wherein $f_{0max}$ is a frequency of the current of the drive coil corresponding to a maximum value of an average voltage on a current-detecting resistor ($R_{25}$), and $f_{0min}$ is a frequency of the current of the drive coil corresponding to a minimum value of the average voltage on the current-detecting resistor ($R_{25}$).

2. The electric cleaning and care appliance as claimed in claim 1, wherein difference between the section modulus in bending of the left side transducer elastic member and the section modulus in bending of the right side transducer elastic member is less than 10%, and difference between the length of the left side transducer elastic member and the length of right side transducer elastic member is less than 10%, so that difference between the deflection amplitude of the left side transducer elastic member and the deflection amplitude of the right side transducer elastic member is less than 10%.

3. The electric cleaning and care appliance as claimed in claim 1, wherein the angle between the longitudinal axis ($L_1$) of the cleaning element (3) and the normal direction of the plane (M) of the transducer elastic member is equal to or greater than 0° and equal to or smaller than 30°.

4. The electric cleaning and care appliance as claimed in claim 1, wherein a thickness of the left and right side transducer elastic members (222, 223) in the normal direction of the plane (M) of the transducer elastic member is smaller than 1/10 of a width of the left and right side transducer elastic members (222, 223) in a direction approximately parallel to the longitudinal axis ($L_2$) of the drive shaft.

5. The electric cleaning and care appliance as claimed in claim 1, wherein in the case of the same magnitude and action point of a driving force, if a deflection of the transducer elastic member caused by a force whose direction is approximately parallel to the longitudinal axis ($L_2$) of the drive shaft and whose vector direction is in the plane (M) of the transducer elastic member is $\xi 1$, and a deflection of the transducer elastic member caused by a force whose direction is approximately perpendicular to the longitudinal axis ($L_2$) of the drive shaft and whose vector direction is perpendicular to the plane (M) of the transducer elastic member is $\xi 2$, then $\xi 1$ is approximately 1/1000 of $\xi 2$.

6. The electric cleaning and care appliance as claimed in claim 1, wherein $-0.1(f_{0max}-f_{0min}) \leq n \leq 0.4 (f_{0max}-f_{0min})$.

7. The electric cleaning and care appliance as claimed in claim 1, wherein $0 \leq n \leq 0.4 (f_{0max}-f_{0min})$.

8. A pressure alarming method for use with an electric cleaning and care appliance comprising: a handle comprising a handle housing, inside which are mounted a power supply portion for supplying power to respective portions of the electric cleaning and care appliance, a control portion for controlling various operation modes of the electric cleaning and care appliance and turning on or off the electric cleaning and care appliance, a trigger portion for turning on or off operation of the electric cleaning and care appliance and a driver for converting input electric energy into mechanical energy output, the driver comprising a transducer, a drive coil, and a drive coil iron core provided in the drive coil, wherein when an alternating current flows through the drive coil, permanent magnets provided on the transducer are subjected to a reaction force of an electromagnetic force and drive the transducer to make reciprocating rotary motion at a frequency of the alternating current, thereby driving a cleaning element fit on a drive shaft of the transducer to make reciprocating rotary motion, wherein the transducer comprises at least two transducer elastic members, the at least two transducer elastic members engage in resonance oscillation motion with bending strain characteristics and are distributed symmetrically on left and right sides of a longitudinal axis ($L_2$) of the drive shaft, an angle between the left and right side transducer elastic members is 180°, and the left and right side transducer elastic members are approximately equal in length and in section modulus in bending, such that deflection amplitude of the left side transducer elastic member and deflection amplitude of the right side transducer elastic member are approximately equal, and flexure direction of the left side transducer elastic member and flexure direction of the right side transducer elastic member are opposite; wherein an angle between an longitudinal axis ($L_1$) of the cleaning element and a normal direction of a plane (M) of the transducer elastic member is 0° to 60°; a frequency of the alternating current in the drive coil is a fixed value equal to $f_{0max}-n$, n being a fixed value in the range of $-0.3(f_{0max}-f_{0min})$ to $0.85(f_{0max}-f_{0min})$, wherein $f_{0max}$ is a frequency of the current of the drive coil corresponding to a maximum value of an average voltage on a current-detecting resistor ($R_{25}$), and $f_{0min}$ is a frequency of the current of the drive coil corresponding to a minimum value of the average voltage on the current-detecting resistor ($R_{25}$), the method comprising the steps of:

1) selecting approximately equal lengths and approximately equal section moduli in bending for the left and right side transducer elastic members in the cleaning and care appliance, such that deflection amplitude of the left side transducer elastic member and deflection amplitude of the right side transducer elastic member are approximately equal, and flexure direction of the left side transducer elastic member and flexure direction of the right side transducer elastic member are opposite, and adjusting the angle between the longitudinal axis ($L_1$) of the cleaning element and the normal direction of the plane (M) of the transducer elastic member to from 0° to 60°;

2) detecting average voltages ($U_{LR25}$) on the current-detecting resistor ($R_{25}$) connected in series with the drive coil of the cleaning and care appliance corresponding to different frequencies in the range of resonance oscillation frequencies;

3) from the average voltages ($U_{LR25}$) on the current-detecting resistor ($R_{25}$) at different frequencies recorded in step 2), selecting and recording a frequency $f_{Omax}$ of the current of the drive coil corresponding to a maximum value of the average voltage on the current-detecting resistor ($R_{25}$) and a frequency $f_{Omin}$ of the current of the drive coil corresponding to a minimum value of the average voltage on the current-detecting resistor ($R_{25}$);

4) setting $f_{Omax}$–n and storing the $f_{Omax}$–n in a program of a programmable microchip processor (IC), and using the $f_{Omax}$–n corresponding to a selected n value as a fixed frequency ($f_0$) of an alternating current flowing through the drive coil, wherein $-0.3(f_{Omax}-f_{Omin}) \leq n \leq 0.85(f_{Omax}-f_{Omin})$ 5) pre-storing an average value ($U_{Ls}$) of a power supply voltage and an average voltage ($U_{LR25}$) on the current-detecting resistor ($R_{25}$) at an alarm load in a program of the programmable microchip processor (IC);

6) collecting voltage value ($U_{NR25}$) on the current-detecting resistor ($R_{25}$) as well as current power supply voltage value ($U_{Ns}$) corresponding to a current load, when the cleaning and care appliance is working;

7) comparing the voltage value ($U_{NR25}$) on the current-detecting resistor ($R_{25}$) corresponding to the current load with the average value ($U_{Ls}$) of the power supply voltage at the alarm load pre-stored in the programmable microchip processor (IC); not outputting alarm signal or stopping current pressure alarm signal output, if $(U_{Ns}/U_{Ls}) \times U_{NR25} > U_{LR25}$; and outputting a pressure alarm signal and sending an alarm, if $(U_{Ns}/U_{Ls}) \times U_{NR25} \leq U_{LR25}$.

9. The pressure alarm method as claimed in claim 8, wherein at least one of sound, light, or mechanical vibration modes are used as the pressure alarm manner.

10. The pressure alarm method as claimed in claim 8, wherein adjusting the angle between the longitudinal axis ($L_1$) of the cleaning element (3) and the normal direction of the plane (M) of the transducer elastic member includes adjusting the angle such that a natural frequency ($f_n$) of the transducer increases as a force applied by a load onto the cleaning element (3) increases.

11. The pressure alarm method as claimed in claim 8, further comprising: controlling a rate at which the natural frequency ($f_n$) of the transducer changes as a force applied by the load onto the cleaning element (3) increases, such that the smaller the angle between the longitudinal axis ($L_1$) of the cleaning element (3) and the normal direction of the plane (M) of the transducer elastic member, the greater the rate at which the natural frequency ($f_n$) of the transducer changes as the force applied by the load onto the cleaning element (3) increases; and the greater the angle between the longitudinal axis ($L_1$) of the cleaning element (3) and the normal direction of the plane (M) of the transducer elastic member, the smaller the rate at which the natural frequency ($f_n$) of the transducer changes as the force applied by the load onto the cleaning element (3) increases.

12. The pressure alarm method as claimed in claim 8, wherein the load value for resonant vibration of the transducer and the driving force is selected by selecting the value of n, and the smaller the value of n, the larger the load value for resonant vibration of the transducer and the driving force.

13. A pressure alarm apparatus for an electric cleaning and care appliance, the electric cleaning and care appliance comprising: a handle, a handle housing (105), a power supply portion mounted inside the handle housing (105), a control portion mounted inside the handle housing (105), and a driver (110) mounted inside the handle housing (105), the driver (110) comprising a transducer, a drive coil (214), and a drive coil iron core (215) provided in the drive coil (214); when an alternating current flows through the drive coil (214), permanent magnets provided on the transducer are subjected to a reaction force of an electromagnetic force and drive the transducer to make reciprocating rotary motion at a frequency of the alternating current, thereby driving a cleaning element (3) fit on a drive shaft (111) of the transducer to make reciprocating rotary motion; the transducer comprises at least two transducer elastic members (222, 223), the at least two transducer elastic members (222, 223) engage in resonance oscillation motion with bending strain characteristics and are distributed symmetrically on left and right sides of a longitudinal axis (L2) of the drive shaft, an angle between the left and right side transducer elastic members (222, 223) is 180°, lengths of the left side transducer elastic member (222, 223) are approximately equal, and section modulus in bending of the left side transducer elastic member (222) and section modulus in bending of the right side transducer elastic member (223) are approximately equal, so that deflection amplitude of the left side transducer elastic member (222) and deflection amplitude of the right side transducer elastic member (223) are approximately equal, and flexure direction of the left side transducer elastic member (222) and flexure direction of the right side transducer elastic member (223) are opposite; wherein an angle between an longitudinal axis (L1) of the cleaning element (3) and a normal direction of a plane (M) of the transducer elastic member is 0° to 60°, the pressure alarm apparatus comprising a detection, collection and alarm circuit and an alarm component, wherein the circuit comprises a power supply, a programmable microchip processor (IC) and an H-bridge circuit formed of transistors for joining the power supply and the drive coil (214); $f_{Omax}$–n is stored in the program of the microchip processor (IC); $f_{Omax}$–n corresponding to a selected n value is used as a fixed frequency $f_0$ of the alternating current flowing through the drive coil (214), wherein $-0.3(f_{Omax}-f_{Omin}) \leq n \leq 0.85(f_{Omax}-f_{Omin})$, $f_{Omax}$ is a frequency of the current of the drive coil corresponding to a maximum value of an average voltage on a current-detecting resistor ($R_{25}$), and $f_{Omin}$ is a frequency of the current of the drive coil corresponding to a minimum value of the average voltage on the current-detecting resistor ($R_{25}$); an average value ($U_{Ls}$) of a power supply voltage and an average voltage ($U_{LR25}$) on the current-detecting resistor ($R_{25}$) at alarm load are also pre-stored in the program of the microchip processor IC; the programmable microchip processor (IC) outputs square waves at a fixed frequency $f_0$ to drive the H-bridge circuit; if $(U_{Ns}/U_{Ls}) \times U_{NR25} > U_{LR25}$, alarm signal is not output or current pressure alarm signal output is stopped; if $(U_{Ns}/U_{Ls}) \times U_{NR25} \leq U_{LR25}$, a pressure alarm signal is output and an alarm is sent.

14. The pressure alarm apparatus as claimed in claim 13, wherein the alarm component is a buzzer device and/or a light emitting device and/or a mechanical vibration device.

15. The electric cleaning and care appliance as claimed in claim 6, wherein $0 \leq n \leq 0.4(f_{Omax}-f_{Omin})$.

* * * * *